(12) United States Patent
Nagl et al.

(10) Patent No.: US 8,980,034 B2
(45) Date of Patent: Mar. 17, 2015

(54) METHOD FOR PRODUCING A FIBRE-REINFORCED PLASTIC COMPONENT

(75) Inventors: Rene Nagl, Hausmannstätten (AT); Philipp Eberl, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 268 days.

(21) Appl. No.: 13/410,403

(22) Filed: Mar. 2, 2012

(65) Prior Publication Data

US 2012/0222799 A1 Sep. 6, 2012

Related U.S. Application Data

(60) Provisional application No. 61/448,782, filed on May 3, 2011.

(30) Foreign Application Priority Data

Jul. 2, 2011 (DE) .......................... 10 2011 106 412

(51) Int. Cl.
*B29C 70/46* (2006.01)
*B29C 70/48* (2006.01)
*B29C 70/86* (2006.01)

(52) U.S. Cl.
CPC .............. *B29C 70/46* (2013.01); *B29C 70/465* (2013.01); *B29C 70/48* (2013.01); *B29C 70/865* (2013.01)
USPC ........... 156/175; 156/169; 156/173; 156/242; 156/245

(58) Field of Classification Search
CPC ....................................................... B29C 70/46
USPC .......... 156/175, 173, 169, 194, 189, 242, 245
See application file for complete search history.

(56) References Cited

U.S. PATENT DOCUMENTS

| 3,970,495 | A | * | 7/1976 | Ashton et al. ................. 156/175 |
| 4,335,587 | A | * | 6/1982 | Thomamueller et al. ..... 156/175 |
| 5,685,933 | A | * | 11/1997 | Ohta et al. .................... 156/175 |
| 2009/0236777 | A1 | | 9/2009 | Chiang | |

FOREIGN PATENT DOCUMENTS

| CN | 101973130 A | 2/2011 |
| DE | 4005771 C1 | 9/1991 |
| DE | 4016042 A1 * | 11/1991 |
| DE | 102010005987 A1 | 2/2011 |
| EP | 1818251 A1 | 8/2007 |
| FR | 2684062 A1 | 5/1993 |
| WO | 2009068127 A1 | 6/2009 |

\* cited by examiner

*Primary Examiner* — Jeff Aftergut
(74) *Attorney, Agent, or Firm* — Jordan IP Law, LLC; Todd A. Vaughn

(57) ABSTRACT

A method for producing a fiber-reinforced plastic component is specified. In a first step, a positive arrangement is produced by fixing at least one reinforcement ready to be used on a positive core. In a second step, fibers are wound around the positive arrangement, concave regions of the positive arrangement that are formed by the reinforcement being spanned by the fibers. In a third step, the entire area of the fibers is pressed onto the positive arrangement in a negative mould. Finally, the component is cured in the negative mould following the introduction of a cross-linking plastic.

20 Claims, 4 Drawing Sheets

METHOD FOR PRODUCING A FIBRE-REINFORCED PLASTIC COMPONENT

CROSS-REFERENCE TO RELATED APPLICATIONS

The present application claims priority under 35 U.S.C. §119 to German Patent Application No. 10 2011 106 412.9 (filed on Jul. 2, 2011), which claims priority to U.S. Provisional Patent Application No. 61/448,782 (filed on Mar. 3, 2011), which are each hereby incorporated by reference in their respective entireties.

FIELD OF THE INVENTION

The invention relates to a method for producing a fibre-reinforced plastic component, with the aid of a positive core, a negative mould and at least one additional reinforcement.

BACKGROUND OF THE INVENTION

It is no longer possible to imagine current technology, and in particular motor vehicle construction, without plastic components. Over the course of time, a multiplicity of different production methods for such plastic components has been developed. In particular, it is known to produce a plastic component with the aid of a positive core, a negative mould and at least one additional reinforcement.

In this regard, DE 10 2006 051 867 A1 discloses, by way of example, a production method for a wheel wound from fibre-reinforced plastic having a spoked wheel hub and a rim bed. A plurality of rings lying on one another in a common surface and joined to one another form the spoked wheel hub, the spoked wheel hub and the rim bed having synthetic resin-impregnated wound carbon fibres and being connected integrally to one another. The rings are produced by winding around a positive core and laying in a negative mould, it also being possible for additional reinforcements to be incorporated in the ring.

DE 10 2006 051 867 A1 discloses the production of plastic components with a principally convex surface, but does not disclose any teaching as to how plastic components with concave sections, which are frequently needed, can be produced. For example, it is known to wind fibres around a positive core and then to dab or tamp them into the concave regions of the positive core with a resin impregnated brush. This is an extremely time-consuming and arduous business, and is therefore, only little suited to the mass production of plastic components of the aforementioned type. Furthermore, the reproducibility of the method, and therefore, a constant quality of the components, is hardly provided.

Also disadvantageous in DE 10 2006 051 867 A1 is the fact that reinforcements are incorporated as resin impregnated fibres are wound around the positive core. The result of this is that it is very laborious to bring the reinforcements into the correct position, since the resin promotes slipping of the reinforcements on the substrate thereof.

SUMMARY OF THE INVENTION

An object of the invention is, therefore, to specify an enhanced production method for a plastic component. In particular, a possible manner for a logical production of plastic components of reproducible quality which include inlaid reinforcements and resultant concave sections of the positive core is to be devised.

This is achieved by a method for producing a fibre-reinforced plastic component, that includes as least one of the following steps: producing a positive arrangement by fixing at least one reinforcement ready to be used on a positive core, winding fibres around the positive arrangement, concave regions of the positive arrangement that are formed by the reinforcement being spanned by the fibres, pressing the entire area of the fibres onto the positive arrangement in a negative mould, and then curing the component in the negative mould following the introduction of a cross-linking plastic.

In accordance with embodiments of the invention, the disadvantages of the related art mentioned hereinabove are overcome. In particular, as a result of fixing the reinforcement on the positive core, slippage of the same is ruled out. Because the concave sections of the positive arrangement are spanned, the arduous and time-consuming dabbing or tamping of the fibres into the concave regions of the positive arrangement is also dispensed with. Overall, the invention therefore offers a method for the logical production of plastic components of reproducible quality.

Advantageous refinements and developments of the invention can then be gathered from the sub-claims and from the description, when viewed together with the figures.

It is beneficial if the positive core is implemented as an inflatable positive core or is composed of foamed plastic. The first variant offers the advantage that the positive core can be reused, the second variant offers the advantage that the positive core can remain in the finished component.

It is beneficial if the reinforcement is composed of at least one of metal, wood and already cured plastic. In this way, the properties of the reinforcement can be matched well to a requirement profile.

It is beneficial if the reinforcement is implemented as a flange. The mounting of the plastic component or other components is therefore easily possible. In particular, the reinforcement can include mounting holes for this purpose.

It is particularly advantageous if the reinforcement has a comb-like or prong-like structure in a contact region with the fibres. In this way, the fibres are prevented from slipping on the positive arrangement. The arrangement prepared for the negative mould thus maintains its shape better during the manipulation, which contributes to even better reproducibility.

In this connection, it is also particularly advantageous if the height or length of the tines or prongs corresponds to the wall thickness of the fibre-reinforced plastic. In this way, the tines/prongs are prevented from projecting out of the finished component.

It is beneficial if the fixing in the first step (of producing a positive arrangement), is implemented in a form-fitting manner. In this way, slipping of the reinforcement on the positive core is effectively avoided. Of course, instead of a form-fitting fixing, the reinforcement can also be adhesively bonded to the positive core, in particular if the latter remains in the finished plastic component.

It is beneficial if the fibres provided are glass fibres, Kevlar fibres, aramid fibres, carbon fibres, vegetable fibres or mixtures of the same. Thus, the mechanical properties of the finished plastic component can be controlled within wide limits.

Moreover, it is beneficial if the fibres are processed in the form of fibre strands, weaves, networks, knits and/or nonwovens. In this way, the mechanical properties of the finished plastic component can be controlled in various directions.

The production of a closed surface is easier in particular with weaves, networks, knits and/or nonwovens than with fibre strands. In particular, it is also possible to use weaves, networks, knits and/or nonwovens produced especially for the plastic component.

It is beneficial if the introduction of the cross-linking plastic by impregnating the fibres with a liquid plastic is carried out between the second step (of winding fibres) and the third step (of pressing the entire area of the fibres), or after the third step (of pressing the entire area of the fibres). The introduction of the cross-linking plastic can be carried out by impregnating the fibres with a liquid plastic (e.g. epoxy resin or polyester resin), for example by spraying on, rolling on or coating between the second step (of winding fibres) and the third step (of pressing the entire area of the fibres). Alternatively or additionally, the introduction of the liquid plastic can also be carried out after the third step (of pressing the entire area of the fibres), that is to say injected into the closed negative mould.

It is beneficial if the component is heated for the purpose of curing. On the one hand, the curing is therefore accelerated, on the other hand the mechanical properties of the finished plastic component can be influenced by the "annealing," as it is known, in particular when epoxy resin or polyester resin is used.

It is also advantageous if the introduction of the cross-linking plastic is carried out by using a fibre mixture containing thermoplastic fibres, and the curing by heating the same. In this way, the introduction of a liquid plastic can be avoided, by which means the production of the plastic component can be carried out in a completely dry manner.

The above refinements and developments of the invention can be combined in any desired way.

BRIEF DESCRIPTION OF THE DRAWINGS

Advantageous refinements of the invention will emerge from the dependent claims. An exemplary embodiment of the invention will be discussed in principle below on the basis of the drawing, in which:

DETAILED DESCRIPTION OF EMBODIMENTS

The production of a fibre-reinforced plastic component is illustrated in FIGS. 1 to 7.

Figure 1:
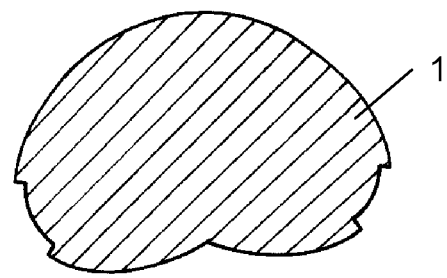
FIG. 1 illustrates a positive core for a plastic component.

As illustrated in FIG. 1, a positive core 1 is provided which, for example, is implemented as an inflatable positive core or is composed of foamed plastic.

Figure 2:
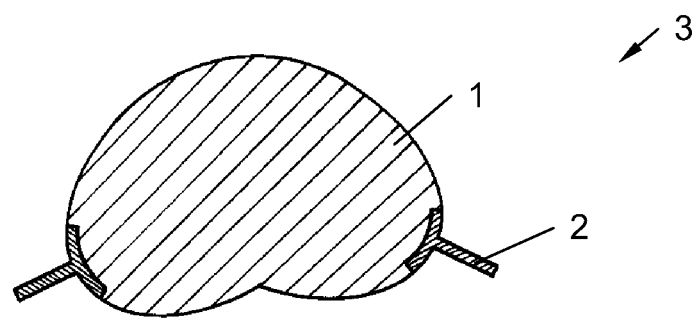
FIG. 2 illustrates a positive arrangement comprising the positive core from FIG. 1 and reinforcements fixed thereto.

As illustrated in FIG. 2, in a first step, reinforcements 2 that are ready to use is fixed to the positive core 1, which produces the positive arrangement 3. The reinforcements 2 can be composed of metal, wood or already cured plastic. In particular, the reinforcements 2 can be implemented as a flange, for example, to fix, attach or otherwise connect the finished plastic component to other components. The step of fixing can in particular be carried out in a form-fitting manner, for example, tongues/depressions in the positive core 1 and depressions/tongues in the reinforcement 2. If the positive core 1 is composed of foamed plastic, the fixing step can also be carried out with pins and/or nails.

Figure 3:
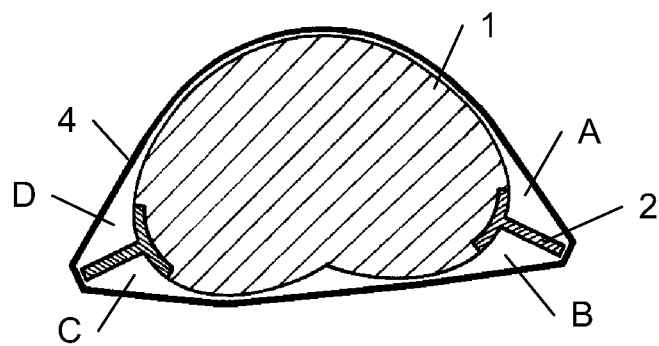
FIG. 3 illustrates the positive arrangement wound around with fibres.

As illustrated in FIG. 3, in a second step, fibres 4 are wound around the positive arrangement 3, concave regions A through D of the positive arrangement 3 that are formed by the reinforcement 2 being spanned by the fibres 4. The fibres 4 provided can be, for example, glass fibres, Kevlar fibres, aramid fibres, carbon fibres, vegetable fibres or mixtures of the same, which are processed in the form of fibre strands, weaves, networks, knits and/or nonwovens. The fibres 4 should be wound so loosely that pressing reliably in the following step is still possible. This is because, in particular, carbon fibres have a very high modulus of elasticity and can thus be stretched only with difficulty. The fibres 4 do not necessarily have to span the concave regions A through D in straight lines but can also sag a little. Conversely, a preload in the finished plastic component can be achieved by comparatively taut winding.

Figure 4:
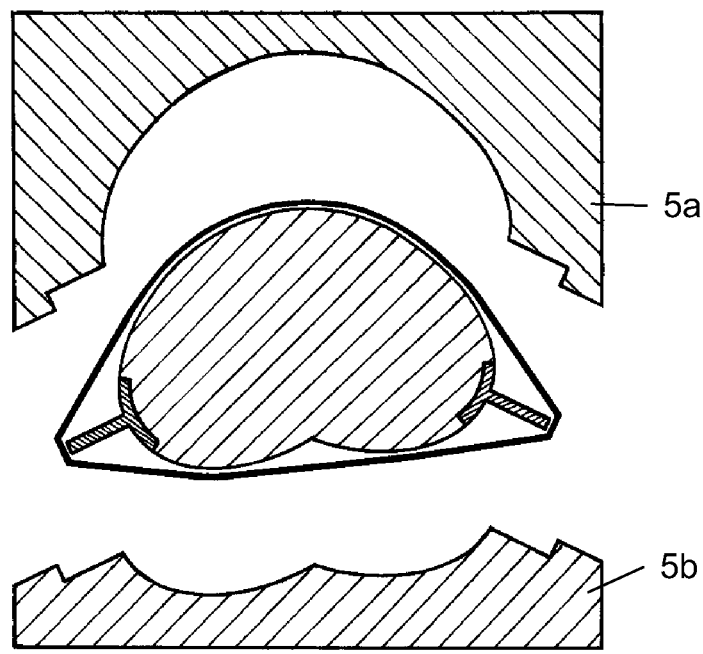
FIG. 4 illustrates the positive arrangement wound around with fibres laid in a negative mould.
Figure 5:
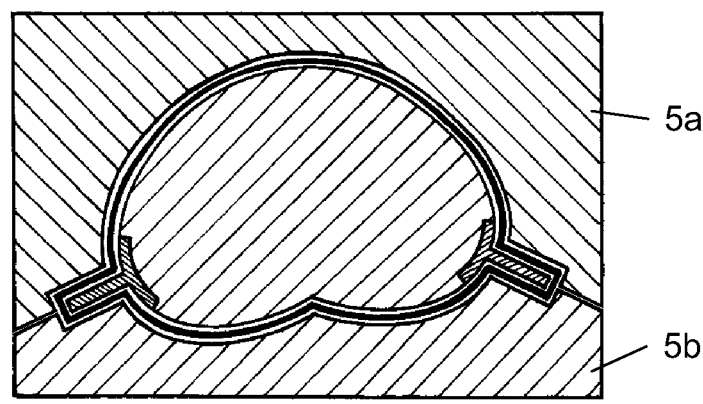
FIG. 5 illustrates the positive arrangement wound around with fibres laid in a negative mould, but with the negative mould closed.

As illustrated in FIGS. 4 and 5, in a third step, the arrangement obtained in the preceding second step is laid in a negative mould 5a, 5b (FIG. 4). The mould 5a, 5b is then closed (FIG. 5). In the process, the entire area of the fibres 4 is pressed onto the positive arrangement 3.

Figure 6:
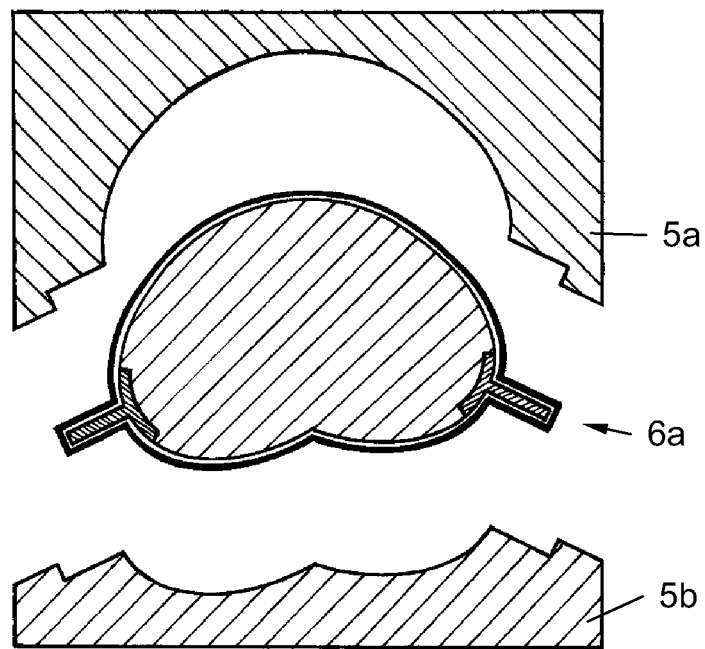
FIG. 6 illustrates the finished plastic component in the opened negative mould.

As illustrated in FIG. 6, in a fourth step, the component 6a in the negative mould 5a, 5b is cured following the introduction of a cross-linking plastic. The component 6a can also be heated for this purpose.

The introduction of the cross-linking plastic can be carried out by impregnating the fibres 4 with a liquid plastic (e.g. epoxy resin or polyester resin). This step can occur between the second and third steps by spraying on, rolling on or by coating the arrangement illustrated in FIG. 3 with the plastic. In this connection, it would also be conceivable, for example, for the positive arrangement 3 illustrated in FIG. 2 already to be wetted with adhesive. In addition, adhesively bonding the reinforcements 2 to the positive core 1 can of course be imagined.

Alternatively or additionally, the introduction of the liquid plastic can also be carried out after the third step, that is to say injected into the closed mould 5a, 5b illustrated in FIG. 5. The channels needed for this purpose are not illustrated, however, for reasons of simplicity. Once more, various resins and, for example, thermoplastics are also suitable as plastics.

In an advantageous variant of the invention, the cross-linking plastic is introduced in the second step by using a fibre mixture containing thermoplastic fibres. The fibres 4 thus also contain thermoplastic fibres. The curing of the component 6a is then carried out by heating the same, as a result of which the thermoplastic fibres melt and cross-link the temperature-stable fibres (e.g. glass fibres, Kevlar fibres, aramid fibres, carbon fibres, vegetable fibres or their mixtures).

Figure 7:
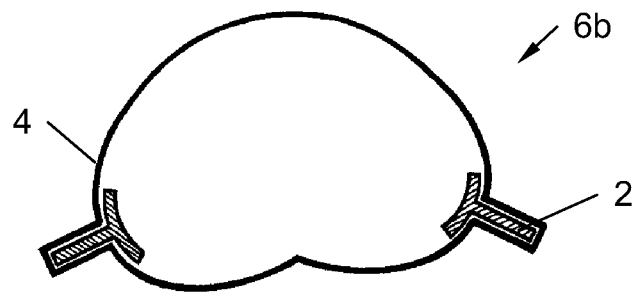
FIG. 7 illustrates the finished plastic component following the removal of the positive core.

Finally, FIG. 6 shows how the finished component 6a is removed from the negative mould 5a, 5b. The latter can be reused in the present case or the positive core 1 is also removed, for example by ventilating an inflatable positive core 1 or by washing out a foamed plastic core. The plastic component 6b obtained in this way is illustrated in FIG. 7.

Figure 8:
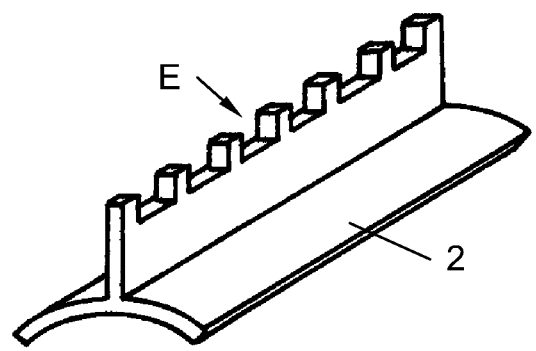
FIG. 8 illustrates a reinforcement with a comb-like structure.

Finally, FIG. 8 illustrates an advantageous configuration of the reinforcement 2. In a contact region with the fibres 4, this has a comb-like or prong-like structure F, so that the fibres 4 do not slip so easily and the arrangement illustrated in FIG. 3 maintains its shape better. The height or length of the tines or prongs preferably corresponds to the wall thickness of the fibre-reinforced plastic, so that the tines/prongs do not project out of the finished component 6a, 6b.

Finally, it is recorded that the component parts of the figures are possibly not illustrated to scale. Positional statements such as "right," "left," "top," "bottom" and the like relate to the illustrated position of the respective component and must be adapted appropriately mentally if the said position is changed. Furthermore, it is pointed out that the shape of the component 6a, 6b illustrated is of course purely exemplary and may not be used to limit the area of protection of the patent claims. The person skilled in the art can apply the teaching disclosed here easily to any component form.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for producing a fibre-reinforced plastic component, the method comprising:
   producing a positive arrangement by fixing at least one reinforcement on an outer surface of a positive core;
   winding fibres around the positive arrangement such that concave regions of the positive arrangement that are formed by the reinforcement are spanned by the fibres;
   pressing, in a negative mould, the wound fibres onto the positive arrangement to produce the component, wherein the component includes the at least one reinforcement; and
   curing the component in the negative mould following the introduction of a cross-linking plastic,
   wherein the at least one reinforcement includes a prong-like structure in a contact region with the fibres.

2. The method of claim 1, wherein the positive core is inflatable.

3. The method of claim 1, wherein the positive core is composed of foamed plastic.

4. The method of claim 1, wherein the at least one reinforcement is composed of metal.

5. The method of claim 1, wherein the at least one reinforcement is composed of wood.

6. The method of claim 1, wherein the at least one reinforcement is composed of plastic.

7. The method of claim 1, wherein the prong-like structure has a plurality of projections in the contact region with the fibres.

8. The method of claim 7, wherein the length of the projections corresponds to a wall thickness of the fibre-reinforced plastic component.

9. The method of claim 1, wherein the fibres comprise at least one of glass fibres, Kevlar fibres, aramid fibres, carbon fibres, vegetable fibres and combinations thereof.

10. The method of claim 1, wherein the fibres are processed in a form of at least one of fibre strands, weaves, networks, knits and nonwovens.

11. The method of claim 1, wherein introducing the cross-linking plastic is implemented by impregnating the fibres with a liquid plastic.

12. The method of claim 1, wherein introducing the cross-linking plastic is implemented between winding the fibres and pressing the entire area of the fibres.

13. The method of claim 1, wherein introducing the cross-linking plastic is implemented after pressing the entire area of the fibres.

14. The method of claim 1, wherein curing the component is implemented by heat.

15. The method of claim 1, wherein:
   introducing the cross-linking plastic is implemented using a fibre mixture containing thermoplastic fibres; and
   the curing is implemented by heat.

16. A method for producing a fibre-reinforced plastic component, the method comprising:
   fixing a plurality of reinforcements to an outer surface of a positive core to thereby produce a positive arrangement;
   winding fibres around the positive arrangement such that concave regions of the positive arrangement formed by the reinforcements are spanned;
   producing the component by placing the positive arrangement having the wound fibers in an open, negative mould and pressing the wound fibers onto the positive arrangement by closing the negative mould, wherein the component includes the reinforcements;
   introducing a cross-linked plastic into the component by impregnating the fibres with a liquid plastic; and
   curing the component having fibres impregnated with liquid plastic in the negative mould,
   wherein the reinforcements respectively include a prong-like structure in a contact region with the fibres.

17. The method of claim 16, wherein:
   the positive core is composed of foamed plastic;
   the reinforcements are composed of one of metal, wood and cured plastic; and
   the fibres comprise at least one of glass fibres, Kevlar fibres, aramid fibres, carbon fibres, vegetable fibres and mixtures thereof.

18. The method of claim 16, wherein:
   the prong-like structure permit the fibre-reinforced plastic component to be connected to other components; and
   the prong-like structure has a plurality of projections in the contact region with the fibres.

19. The method of claim 16, wherein fixing the plurality of reinforcements to the positive core comprises form-fitting each reinforcement to corresponding depression on the positive core.

20. A method for producing a plastic component, the method comprising:
   producing a positive arrangement by fixing a plurality of reinforcements to an outer surface of a positive core;
   winding a fibre mixture containing thermoplastic fibres around the positive arrangement;
   placing the positive arrangement having the wound fibre mixtures in a negative mould;
   producing the component by pressing the wound fibers onto the positive arrangement, wherein the component includes the reinforcements; and
   heating the component,
   wherein the reinforcements respectively include a prong-like structure having a plurality of projections in a contact region with the fibres.

* * * * *